3,531,443
Patented Sept. 29, 1970

3,531,443
POLY-m- AND p-CARBORANYLENEDISULFIDES

Stelvio Papetti, Hamden, Nick S. Semenuk, New Haven, and Hansjuergen A. Schroeder, Hamden, Conn., assignors to Olin Corporation, a corporation of Virginia
No Drawing. Filed July 22, 1968, Ser. No. 746,290
Int. Cl. C08g 23/00, 33/00
U.S. Cl. 260—79
9 Claims

ABSTRACT OF THE DISCLOSURE

Polycarboranylene disulfides consisting essentially of recurring units of the formula:

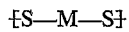

wherein M is the meta or para carboranylene radical, are prepared, for example, by reacting absolute ethanol with a bis(halosulfenyl)-m-carborane or a bis(halosulfenyl)-p-carborane. These polymeric products are useful as high energy fuels when compounded with oxidizers.

---

This invention relates to polycarboranylenedisulfides and to methods for their preparation.

More particularly, this invention relates to novel carboranylenedisulfide polymers prepared, for example, by reacting a bis(chlorosulfenyl)-m- or p-carborane with an absolute alkanol such as ethanol. The novel disulfide polymers of this invention can also be prepared by reacting chlorine with the dilithio salt of bismercapto-m-carborane or p-carborane in the presence of an inert solvent which can be, for example, n-hexane. There is also a third method by which these novel polycarboranylenedisulfides can be prepared, and in this method, the dilithio salt of m-carborane or p-carborane is reacted with sulfur dichloride in the presence of diethyl ether. The invention herein described was made in the course of or under a contract or subcontract thereunder with the Department of the Navy.

The novel polymers of this invention consist essentially of recurring units of the formula:

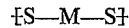

wherein M represents the meta carboranylene or the para carboranylene radical. The molecular weight of the polymers of this invention may vary from about 400 to about 5000 or more.

In the first method for preparing the novel polymers of this invention a bis(chlorosulfenyl)-m- or p-carborane is heated in the presence of absolute ethanol. The resulting polymer can be recovered from the reaction mixture by filtration or by decantation as well as by other processes well known in the art. Recrystallization from solvents, such as chloroform, yields a pure, white polymeric product. Generally, the reaction is carried out at temperatures ranging from about 50 to about 120° C. and, preferably, it is conducted at the reflux temperature of the alkanol.

In a second process for preparing the novel polymers of this invention, chlorine is reacted with the dilithio salt of the bismercapto-m- or p-carborane in the presence of an inert solvent which can be, for example, petroleum ether, n-hexane, heptane, etc. The product which is formed as a suspension in the reaction mixture can be separated by any of the procedures well known in the art such as filtration, centrifugation, etc. The recovered polymer can be washed with water or aqueous base to remove hydrogen chloride which is formed during the reaction and a purified polymer can be prepared by recrystallization from o-xylene, o-dichlorobenzene, toluene, ethylene dichloride, etc. The reaction temperature can be varied from about −30° to about +25° C. and preferably will be between about −20° and −10° C. depending upon reaction conditions.

In a third method for preparing the novel polymers of this invention, the dilithio salt of m-carborane or p-carborane is first prepared by reacting the respective carborane in diethyl ether with a solution of n-butyl lithium in an inert solvent, under nitrogen. In turn, the dilithio salt as a suspension in an inert solvent is then reacted with sulfur dichloride dissolved in, for example, diethyl ether. The reaction temperature is maintained between about −10° C. and about +30° C. and preferably between about −10 and about 0° C. The polymer can be recoverd by a number of methods known in the art. For example, the polymeric product can be hydrolyzed by adding the reaction mixture to ice-water after which the polymer can be recovered by filtration followed by drying in vacuo. The polymer, in pure form, can be obtained by recrystallization from ethylene dichloride, or other similar solvents.

Although the reactions in the three processes described are conveniently carried out at atmospheric pressure, subatmospheric pressures as well as pressures of up to about +5 atmospheres can be employed.

Depending upon the particular reaction conditions employed, the time of reaction for each of the three described process will vary widely although usually it will be from about 0.2 to about 10 hours or more.

The term "carborane" is a generic term used to describe all three isomers of dicarbaclosododecaborane having the empirical formula:

$$B_{10}C_2H_{12}$$

The ortho isomer of carborane, i.e., 1,2-dicarbaclosododecaborane or o-carborane is represented by the following formula:

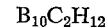

The term ortho carboranylene is applied to the radical derived from o-carborane having the formula:

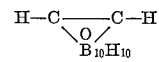

1,7-dicarbaclosododecaborane or m-carborane is represented by the formula:

$$H-CB_{10}H_{10}C-H$$

and the m-carboranylene radical is likewise shown by:

$$-CB_{10}H_{10}C-$$

Finally, the para isomer of carborane or 1,12-dicarbaclosododecaborane is represented by the formula:

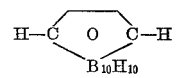

and the corresponding carboranylene radical; i.e., p-carboranylene has the formula:

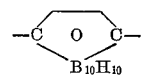

All three isomers are conveniently accessible by well established synthetic procedure. o-Carborane is best prepared from the reaction of decaborane with a Lewis base and acetylene in an ether solvent (Inorg. Syntheses, vol. X). m-Carborane is readily obtained by a thermoisomerization flow process from the ortho isomer at temperatures above 475° C. (I and EC Prod. Res. and Dev., 5, 334 (1966)). The same apparatus is used to convert o-carborane, m-carborane or a mixture thereof to the para isomer at temperatures between 630° and 750° C.

The reaction by which the bis(chlorosulfenyl)-carboranes utilized as starting materials in one of the processes of this invention are prepared as shown below, where for purposes of illustration the preparation of 1,7-bis(chlorosulfenyl)-m-carborane is shown:

$$HS-CB_{10}H_{10}C-SH + Cl_2 \xrightarrow{(CCl_4)} ClS-CB_{10}H_{10}C-SCl + 2HCl$$

The above-mentioned bis(chlorosulfenyl)-carboranes can be conveniently prepared by the process set forth in application S.N. 726,195, filed May 2, 1968 in the names of Hansjuergen A. Schroeder and Nick S. Semenuk. For example, the compound 1,7-bis(chlorosulfenyl)-m-carborane can be prepared as follows:

A solution of 10.42 g. (0.05 mole) of 1,7-bismercapto-m-carborane in 100 ml. of carbon tetrachloride is cooled to $-20°$ C. and stirred mechanically under a nitrogen blanket. To this solution, maintained at $-20$ to $-15°$ C., there is added over a one-hour period, a solution of 7.80 g. (0.11 mole) of chlorine in 100 ml. of carbon tetrachloride. The resulting solution is allowed to warm slowly to room temperature and then permitted to stand at room temperature under nitrogen overnight. Evaporation of the carbon tetrachloride solution yields an orange-yellow residue (14.3 g.) which is vacuum distilled to yield (66 percent of theoretical) 1,7-bis(chlorosulfenyl)-m-carborane having the formula:

$$ClS-CB_{10}H_{10}C-SCl$$

B.P. 92–93° C./0.15 mm.; $n_D^{25}$ 1.6173.

Useful bis(halosulfenyl)-carborane derivatives which can be employed as starting materials in the first-described process of this invention include, for example, 1,7-bis(chlorosulfenyl)-m-carborane, 1,12-bis(chlorosulfenyl)-p-carborane and the corresponding bromine and iodine derivatives. Alkanols useful in the first method include those of the formula:

$$R-OH$$

where R is alkyl of from 1 to 4 inclusive carbon atoms. Methanol, ethanol, n-propanol, isopropanol, n-butanol, etc. are examples of suitable alkanols.

Mercapto-substituted carboranes useful in preparing the dilithio salts of bismercapto-m- or p-carborane include 1,7 - bismercapto - m - carborane and 1,12-bismercapto-p-carborane.

The above-mentioned carborane derivatives can be conveniently prepared by the process set forth in application S.N. 554,151, filed May 31, 1966 in the names of Claytion O. Obenland, Stelvio Papetti and Hampton D. Smith, Jr. For example, the compound 1,7-bismercapto-m-carborane can be prepared as follows:

A slurry on 1,7-dilithio-m-carborane (LiCB$_{10}$H$_{10}$Cli) (0.174 mole) in diethyl ether (200 ml.) is prepared under an atmosphere of nitrogen and the slurry cooled in an ice bath with rapid stirring. At a temperature of about 5° C., powdered sulfur (0.366 mole) is added through an addition funnel and the rate of addition is adjusted to maintain a reaction mixture temperature below 10° C. for 1 hour. Then the reaction mixture is allowed to warm slowly to ambient temperature and the reaction mixture is stirred for about 16 hours. Hydrochloric acid (200 ml. of a 20 percent solution) is added to the reaction mixture and after a few minutes, two liquid phases form which were separated in a separatory funnel and the ether layer dried over anhydrous magnesium sulfate. The ether is removed under vacuum, yielding a yellow solid. The solid is sublimed at 100°–140° C. in vacuo and the resulting crystals are recrystallized from aqueous ethanol to provide about 7.1 grams of white bismercapto-m-carborane, M.P. 164–165° C.

The dilithio m- and p-carborane salts which are useful as starting materials in the third-mentioned process of this invention can be prepared by the process described in U.S. Pat. 3,148,219. For example, C,C'-dilithio-m-carborane (i.e., Li—CB$_{10}$H$_{10}$C—Li) can be formed by reacting m-carborane with n-butyl lithium in the presence of dialkyl ether. The corresponding para carborane derivative can be formed in the same manner.

The solid poly-m- and p-carboranylenedisulfide products of this invention when incorporated with suitable oxidizers such as ammonium perchlorate, potassium perchlorate, sodium perchlorate and the like in an amount equal to about 15–25 percent by weight of the carborane derivatives yield solid propellants suitable for rocket power plants. These propellants burn with high flame speeds, have high heats of combustion and are of the high specific impulse type. In addition to the oxidizer and oxidizable material the propellant composition may also contain an artificial resin, such as a partially condensed urea-formaldehyde or phenol formaldehyde resin in an amount of about 5 to about 10 percent by weight of the oxidizer and the boron compound. The ingredients can be mixed with simultaneous removal of solvent after which the solvent free mixture can be molded into any desired shape as by extrusion. Curing of the resin can then be accomplished by heating at moderate temperatures.

The following examples illustrate various embodiments of this invention and are to be considered not limitative:

EXAMPLE I

Poly-m-carboranylenedisulfide from m-B$_{10}$H$_{10}$C$_2$S$_2$Cl$_2$ and ethanol A total of 5.54 g. (0.02 mole) of bis(chlorosulfenyl)-m-carborane (i.e., ClS—CB$_{10}$H$_{10}$C—SCl) was refluxed in 100 ml. absolute ethanol for 6 hours. Upon cooling, the suspension was filtered, and a portion of the residue (2.30 g.) was recrystallized from chloroform to yield a white, polymeric solid, M.P. 308–310° C., consisting essentially of recurring units of the formula:

$$\{S-CB_{10}H_{10}C-S\}$$

In a separate experiment, utilizing the same reactants and conditions, the same polymer was prepared and recrystallized from o-xylene, M.P. 307–310° C. This polymer was submitted for elemental analysis and the following results were obtained:

*Analysis.*—Calc'd for $(C_2H_{10}B_{10}S_2)_x$ (percent): C, 11.61; H, 4.85; B, 52.51; S, 31.00. Found (percent): C, 13.90; H, 5.19; B, 48.4; S, 29.0. Mol. wt. (by osmometry): 1771.

EXAMPLE II

Poly-m-carboranylenedisulfide from m—B$_{10}$H$_{10}$C$_2$S$_2$Li$_2$ and chlorine The dilithio salt of bismercapto-m-carborane (i.e., HS—CB$_{10}$H$_{10}$C—SH) was prepared from 10.42 g. (0.05 mole) of the dimercaptan dissolved in 150 ml. diethyl ether and 62.5 ml. (0.10 mole) of 1.6 M n-butyl lithium solution (in hexane). After inverse filtration, the dilithio salt of bismercapto-m-carborane (i.e., $$LiS-CB_{10}H_{10}C-SLi)$$

was suspended in 300 ml. (30–60° C.) petroleum ether in the dark. With the temperature maintained at $-20$ to 15° C. and using a nitrogen sweep, chlorine gas was passed into the suspension at a moderate rate. After about 2 hours, an exotherm was noticed. Continued cooling and more nitrogen purging finally removed all further hydrogen chloride from the mixture. The suspension was filtered and a total of 5.6 g. precipitate was isolated. After washing with water to a negative halide test and recrystallization from o-xylene, a total of 1.2 g. of poly-m-carboranylenedisulfide consisting essentially of recurring units of the formula:

$$\{S-CB_{10}H_{10}C-S\}$$

was isolated, M.P. 315–317° C.

*Analysis.*—Calc'd for $(C_2H_{10}B_{10}S_2)_x$ (percent): C, 11.61; H, 4.85; B, 52.51; S, 31.00. Found (percent): C, 12.72; H, 5.01; B, 50.37; S, 28.2.

EXAMPLE III

Poly-m-carboranylenedisulfide from m—$B_{10}H_{10}C_2Li_2$ and sulfur dichloride The dilithio salt of m-carborane was prepared under nitrogen by the addition of a hexane solution of n-butyl lithium (138 ml. 0.22 mole of 1.59 M solution) to 14.4 g. (0.1 mole) of m-carborane in 150 ml. of ethyl ether. An additional 200 ml. of hexane was added, the salt isolated by inverse filtration and finally suspended in 200 ml. of diethyl ether.

Sulfur dichloride (22.7 g., 0.22 mole) was dissolved in 100 ml. of ethyl ether and the suspension of the dilithio salt of m-carborane (i.e., Li—$CB_{10}H_{10}C$—Li) added slowly, while the temperature was maintained at −10° C. After this addition, the product was stirred at ambient temperature for 60 minutes and then hydrolyzed by adding the product to ice-water. The resulting suspension was filtered and the precipitate dried in vacuo. The crude polymeric product was recrystallized from ethylene dichloride to yield 7.0 g. (34 percent of the theoretical yield) of a white polymeric product (M.P. 231–3° C.) consisting essentially of recurring units of the formula:

$$\text{-[S—}CB_{10}H_{10}C\text{—S]-}$$

*Analysis.*—Calc'd for $(C_2H_{10}B_{10}S_2)_x$ (percent): C, 11.61; H, 4.85; B, 52.51; S, 31.00. Found (percent): C, 11.59; H, 4.89; B, 50.11; S, 28.20. Mol. wt. (by osmometry): 1265.

The boron-containing solid poly-m- and p-carboranylenedisulfide products of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, ammonium nitrate and the like. In formulating a solid propellant composition employing one of the materials produced in accordance with the present invention, generally from 10 to 35 parts by weight of the boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided boron-containing material can be admixed with a high solids content solution of partially condensed urea-formaldehyde or phenol-formaldehyde resin, the proportions being such that the amount of resin is about .5 to 10 percent by weight of oxidizer and polycarboranylenedisulfide polymer. The ingredients can be thoroughly mixed with simultaneous removal of solvent, and following this the solvent-free mixture can be molded into the desired shape as by extrusion. Thereafter, the resin can be cured by resorting to heating at moderate temperatures. For further information concerning the formulation of solid propellant compositions, reference is made to U.S. Pat. 2,622,277 to Bonnell and to U.S. Pat. 2,646,596 to Thomas.

What is claimed is:

1. A polymer consisting essentially of recurring units of the formula:

$$\text{-[S—M—S]-}$$

where M is selected from the group consisting of the meta carboranylene radical and the para carboranylene radical.

2. The polymer of claim 1 wherein M is the meta carboranylene radical.

3. A process for preparing a polycarboranylenedisulfide which comprises reacting at a temperature from about 50° to about 120° C. an absolute alkanol having the formula:

$$\text{R—OH}$$

wherein R is alkyl of 1 to 4 inclusive carbon atoms, with a compound of the formula:

$$\text{XS—M—SX}$$

where X is a halogen selected from the group consisting of chlorine, bromine, and iodine and M is selected from the group consisting of the meta carboranylene radical and the para carboranylene radical.

4. The process of claim 3 wherein the said alkanol is ethanol and the said compound is:

$$\text{ClS—}CB_{10}H_{10}C\text{—SCl}$$

5. A process for preparing a polycarboranylenedisulfide which comprises reacting chlorine with a compound of the formula:

$$\text{LiS—M—SLi}$$

where M is selected from the group consisting of the meta carboranylene radical and the para carboranylene radical, in the presence of an inert solvent.

6. The process of claim 5 wherein the said compound is:

$$\text{LiS—}CB_{10}H_{10}C\text{—SLi}$$

7. The process of claim 5 wherein the reaction is conducted in the presence of petroleum ether.

8. The process for preparing a polycarboranylenedisulfide which comprises reacting sulfur dichloride with a compound of the formula:

$$\text{Li—M—Li}$$

wherein M is selected from the group consisting of the meta carboranylene radical and the para-carboranylene radical in the presence of an inert solvent.

9. The process of claim 8 wherein the said compound is:

$$\text{Li—}CB_{10}H_{10}C\text{—Li}$$

and the said inert solvent is diethyl ether.

References Cited

UNITED STATES PATENTS 3,223,563    12/1965    Atteberry et al. _____ 149—19

DONALD E. CZAJA, Primary Examiner

M. I. MARQUIS, Assistant Examiner

U.S. Cl. X.R.

260—606.5, 838, 849; 149—22